United States Patent
Alvarez et al.

(10) Patent No.: US 12,243,194 B2
(45) Date of Patent: Mar. 4, 2025

(54) STED MICROSCOPY METHOD WITH IMPROVED SIGNAL TO NOISE RATIO IN LOW PHOTON COUNT IMAGING CONDITIONS

(71) Applicant: LEICA MICROSYSTEMS CMS GMBH, Wetzlar (DE)

(72) Inventors: Luis Alvarez, Heidelberg (DE); Frank Hecht, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 330 days.

(21) Appl. No.: 17/636,035

(22) PCT Filed: Oct. 8, 2020

(86) PCT No.: PCT/EP2020/078317
§ 371 (c)(1),
(2) Date: Feb. 17, 2022

(87) PCT Pub. No.: WO2021/069611
PCT Pub. Date: Apr. 15, 2021

(65) Prior Publication Data
US 2022/0343467 A1    Oct. 27, 2022

(30) Foreign Application Priority Data
Oct. 9, 2019   (EP) .................................... 19202285

(51) Int. Cl.
*G06T 5/70* (2024.01)
*G01N 21/64* (2006.01)
*G06T 5/10* (2006.01)
*G06T 5/20* (2006.01)
*G06T 5/50* (2006.01)

(52) U.S. Cl.
CPC ........... *G06T 5/70* (2024.01); *G01N 21/6428* (2013.01); *G01N 21/6458* (2013.01); *G06T 5/10* (2013.01);
(Continued)

(58) Field of Classification Search
CPC .... G06T 5/70; G06T 5/10; G06T 5/20; G06T 5/50; G06T 2207/10056;
(Continued)

(56) References Cited

U.S. PATENT DOCUMENTS

| 5,731,588 A | 3/1998 | Hell et al. |
| 9,551,658 B2 | 1/2017 | Hell et al. |

(Continued)

FOREIGN PATENT DOCUMENTS

| CN | 109523488 A | * | 3/2019 | ........... G06K 9/6247 |
| EP | 0 801 759 B1 | | 8/2001 | |
| JP | 2014/108358 A | | 6/2014 | |

OTHER PUBLICATIONS

Sun et al., A novel pulsed STED microscopy method using FastFLIM and the phasor plots, Feb. 2017, Progress in Biomedical Optics and Imaging Spie, vol. 10069. (Year: 2017).*

(Continued)

*Primary Examiner* — Said M Elnoubi
(74) *Attorney, Agent, or Firm* — LEYDIG, VOIT & MAYER, LTD.

(57) ABSTRACT

The present invention relates to a method for generating a result image. The method comprises the steps of: acquiring a STED image of a sample, the STED image comprising pixels; calculating Fourier coefficients of arrival times for the pixels of the image, resulting in real coefficients representing a first image and in imaginary coefficients representing a second image; deriving an intensity image from the STED image; applying a spatial filter to the first image, the second image and the intensity image, resulting in a filtered first image, a filtered second image, and filtered intensity image, respectively; calculating an image G based on the filtered first image and the filtered intensity image; calculating an image S based on the filtered second image and the (Continued)

filtered intensity image; and calculating a result image based on the image G and the image S.

11 Claims, 3 Drawing Sheets

(52) U.S. Cl.
CPC ............... *G06T 5/20* (2013.01); *G06T 5/50* (2013.01); *G01N 2021/6439* (2013.01); *G06T 2207/10056* (2013.01); *G06T 2207/10064* (2013.01); *G06T 2207/20064* (2013.01)

(58) Field of Classification Search
CPC . G06T 2207/10064; G06T 2207/20064; G06T 2207/20032; G06T 2207/20048; G01N 21/6428; G01N 21/6458; G01N 2021/6439; G01N 21/6408
See application file for complete search history.

(56) References Cited

U.S. PATENT DOCUMENTS

| | | | | |
|---|---|---|---|---|
| 2009/0175535 | A1* | 7/2009 | Mattox | ............... G06T 5/50 382/164 |
| 2012/0276578 | A1 | 11/2012 | Stringari et al. | |
| 2014/0153692 | A1 | 6/2014 | Larkin et al. | |

| | | | |
|---|---|---|---|
| 2019/0287222 | A1 | 9/2019 | Cutrale et al. |

OTHER PUBLICATIONS

Digman et al., Flourescence Lifetime Spectroscopy and Imaging, 2014, CRC Press, Chapter 10 The phasor approach to fluorescence lifetime imaging: Exploiting phasor linear properties (Year: 2014).*
Sendur et al., Bivariate Shrinkage With Local Variance Estimation, Dec. 2002, IEEE Signal Processing Letters, vol. 9, No. 12,. (Year: 2002).*
Sun Yuansheng et al.: "A novel pulsed STED microscopy method using FastFLIM and the phasor plots", Progress in Biomedical Optics and Imaging, SPIE—International Society for Optical Engineering, Bellingham, WA, US, vol. 10069, Feb. 21, 2017 (Feb. 21, 2017), pp. 100691C-1-100691C-16, XP060086016.
Lanzanò et al. "Encoding and decoding spatio-temporal information for super-resolution microscopy," Nature Communications,6:6701, UK, 10.1038/ncomms7701, Apr. 2, 2015, pp. 1-9.
Digman, M. and E. Gratton, "The phasor approach to fluorescence lifetime imaging: exploiting phasor linear properties," Fluorescence Lifetime Spectroscopy and Imaging: Principles and Applications in Biomedical Diagnostics (ed. L Marcu, PMW French, and DS Elson), CRC Press, US, Jan. 1, 2012, pp. 235-248.
Sendur, L. & Selesnick, I., "Bivariate Shrinkage with Local Variance Estimation," Signal Processing Letters, IEEE, vol. 9, No. 12, pp. 438-441, 10.1109/LSP.2002.806054, US, Dec. 2002.

* cited by examiner

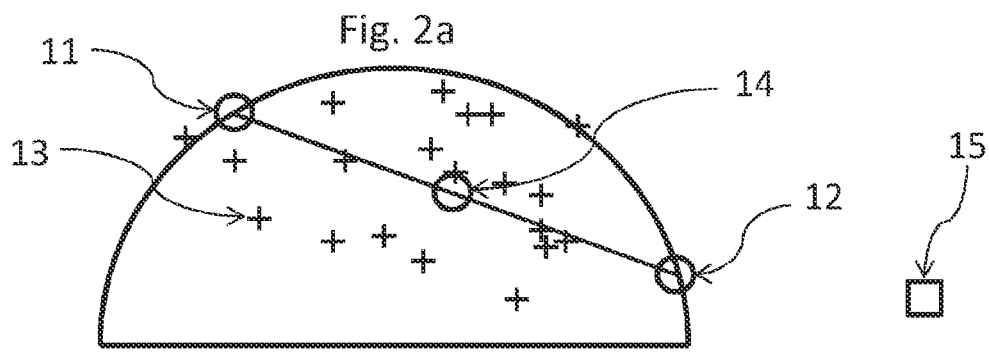
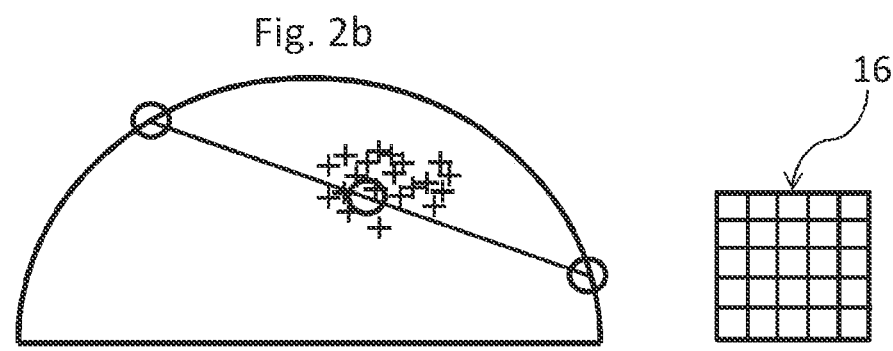
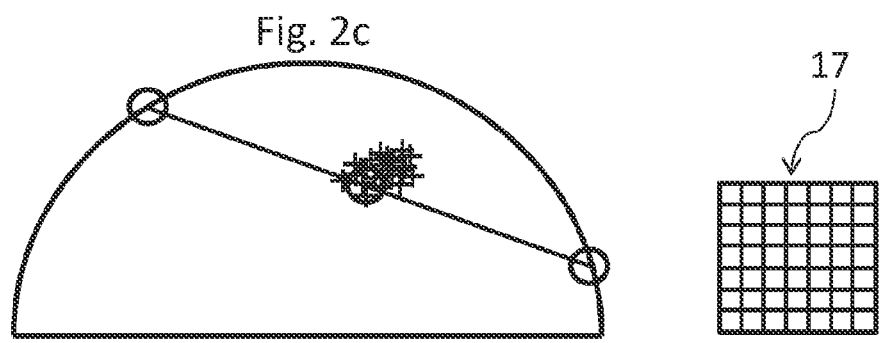
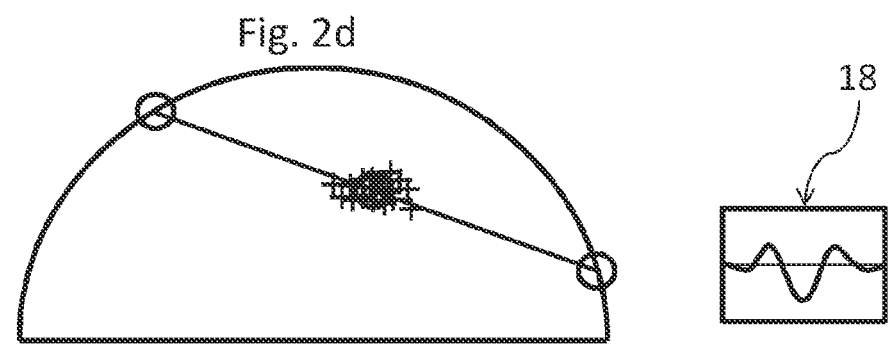

STED MICROSCOPY METHOD WITH IMPROVED SIGNAL TO NOISE RATIO IN LOW PHOTON COUNT IMAGING CONDITIONS

CROSS REFERENCE TO RELATED APPLICATIONS

This application is a U.S. National Phase application under 35 U.S.C. § 371 of PCT International Application No. PCT/EP2020/078317, filed on Oct. 8, 2020, and claims benefit to European Patent Application No. EP 19202285.3, filed on Oct. 9, 2019. The International Application was published in English on Apr. 15, 2021, as WO 2021/069611 A1 under PCT Article 21(2).

FIELD

The present invention relates to STED microscopy, and in particular to a method to increase the signal to noise ratio in STED images under a low photon count condition.

BACKGROUND

In a STED (stimulated emission depletion) fluorescence light microscope, as described e.g. in EP 0 801 759 B1, at least one image of a sample being stained with fluorescent molecules or a fluorescent dye is acquired by exciting the fluorescent molecules or the fluorescent dye by pulses of light in a focal region of a microscope objective. In addition, de-excitation light is applied to the sample to de-excite an area outside a center of the focal region or focal area. Such a microscope can therefore generate images with a spatial resolution below the usual diffraction limit of light. The de-excitation can originate from a pulsed or continuous wave (CW) light source. Both light sources are usually lasers and are called the excitation and depletion laser.

U.S. Pat. No. 9,551,658 B2 describes a method and a device for the extraction of light pulses originating from the sample with even better spatial resolution with the aid of a time-gated detection. The de-excitation light causes a reduction of the fluorescence lifetime. Therefore, the temporal decay of the fluorescence signal is shorter outside the center of the focal area than in the center. In this case the lifetime $\tau$ is given by $$\tau = \frac{1}{k_{nr} + k_r + k_{STED}}$$

where $k_{nr}$ is the rate of non radiative de-excitation, $k_r$ the rate radiative de-excitation and $k_{STED}$ the rate of additional rate of non radiative de-excitation introduced by the depletion laser. A time-gate excludes the signal within a short period after the excitation pulse. The remaining signal is collected. In this time-gated approach also the collection of the light originating from the center of the focal area is incomplete. The signal from the photons which are arriving with the gated off period is lost which leads lower signal to noise ratio than a less good resolved not gated image.

The publication Lanzano et. al. (2015), Encoding and decoding spatio-temporal information for super-resolution microscopy, Nature Communications, 6:6701, 10.1038/ncomms7701, describes a method SPLIT which can save the signal of the early photons by applying the Phasor approach. Here the lifetime decay for each pixel is translated into a polar plot, called a phasor plot. In this plot the coordinates, called a phasor, of each pixel are a linear combination of the coordinates of the three components high resolved signal, low resolved signal and background. The weight of the high resolved component is used as intensity for the resulting image and contains the information from all photons detected. Although the signal of all photons is used, the method has the limitation that a high number of photons have to be acquired. Under low photon count conditions the distribution in the phasor plot is so wide that an improvement of the signal to noise ratio cannot be accomplished.

To achieve a narrower distribution the phasor coordinates have to be filtered. The book chapter Digman et. al. (2012), The phasor approach to fluorescence lifetime imaging: exploiting phasor linear properties, in Fluorescence Lifetime Spectroscopy and Imaging: Principles and Applications in Biomedical Diagnostics (ed. L Marcu, P M W French, and D S Elson), CRC Press, describes a filtering method for phasor plots with the goal to maintain the spatial information by the use of a median filter. However, in the context of super-resolution even this filter method leads to unwanted degradation of the spatial resolution.

In digital image processing more advanced filtering methods are known. As an example the publication Sendur, L. & Selesnick, I., (2003), Bivariate Shrinkage with Local Variance Estimation, Signal Processing Letters, IEEE. 9, 438-441, 10.1109/LSP.2002.806054. describes an advanced denoising filter based on a wavelet transform which better preserves the spatial resolution when applied to images. An attempt to apply this filter or a similar filter on phasor components the same way as the median filter fails due to the strong variations in the noise in the phasor component images.

SUMMARY

In an embodiment, the present disclosure provides a method for generating a result image. The method comprises the steps of: acquiring a STED image of a sample that includes pixels, and calculating Fourier coefficients of photon arrival times for the pixels of the STED image, resulting in real coefficients representing a first image and in imaginary coefficients representing a second image. The method further comprises the steps of deriving an intensity image from the STED image, and applying a spatial filter to the first image, the second image and the intensity image, resulting in a filtered first image, a filter second image, and a filtered intensity image, respectively. The method further comprises the steps of calculating an image G based on the filtered first image and the filtered intensity image, calculating an image S based on the filtered second image and the filtered intensity image, and calculating the result image based on the image G and the image S.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

1a, the region outside the center in FIG. 1b.

FIGS. 2a-2d show the distribution of phasors from twenty image pixels when different filtering methods are applied: FIG. 2a no filter, FIG. 2b median filter 5×5, FIG. 2c median filter 7×7 and FIG. 2d wavelet filter according an embodiment of the present invention. The used data have been simulated for an average of ten photon counts per pixel.

DETAILED DESCRIPTION

Figure 1A:
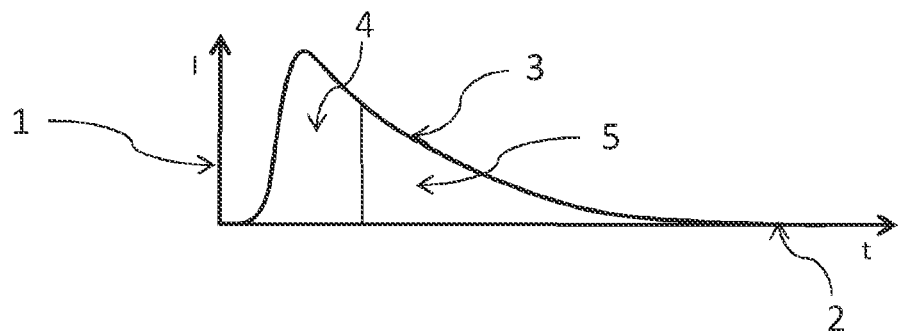
FIGS. 1a-1b show the effect of the STED de-excitation on the lifetime decay and the phasor plot with a typical lifetime decay of the data from the center region of the focus in FIG.

Embodiments of the present invention provide a method to increase the signal to noise ratio in STED images under a low photon count condition while maintaining the spatial resolution of the gated STED approach. The method comprises at least some of the following steps:

acquiring a STED image of a sample, the STED image comprising pixels;
calculating Fourier coefficients of photon arrival times or of photon arrival time data for pixels of the image, resulting in real coefficients and in imaginary coefficients;
the real coefficients representing a first image and the imaginary coefficients representing a second image;
deriving an intensity image from the STED image;
applying a spatial filter to the first image, the second image and the intensity image resulting in a filtered first image, a filtered second image, and a filtered intensity image, respectively;
calculating an image G based on the filtered first image and the filtered intensity image;
calculating an image S based on the filtered second image and the filtered intensity image; and
calculating the result image based on the image G and the image S.

In some embodiments, acquiring the STED image comprises the steps of:

irradiating the sample with pulsed excitation light, wherein the pulsed excitation light comprises a focus when irradiating the sample;
irradiating the sample with de-excitation light surrounding the central region of the focus.

Usually, two-dimensional (but also three-dimensional) STED images of the sample or parts of the sample are acquired using a scanning microscope having a STED functionality. For example, an acquired two-dimensional STED image comprises pixels in x- and y-direction (e.g. 512×512 pixels), depending on the acquisition parameters of the scanning microscope. The arrival times of the photons relative to the laser pulse are recorded for each pixel. The fluorescence lifetime of the typical fluorescence dyes is in the range of 1 to 4 ns. Many STED dyes have multiple lifetime components. In the center of the focal region is no or low de-excitation light and there the natural lifetime is observed. The lifetime is reduced/is lower outside the center of the focal region, but e.g. in the region where the de-excitation light is applied, typically below 1 ns due to the de-excitation process. The reduction on lifetime outside of the center of the focal region is inversely proportional to the depletion energy from the depletion laser. For a typical STED image about 100 photon counts are recorded in bright pixels. The calculation of the Fourier coefficients of the photon arrival times is performed on a pixel basis, preferably for all pixels of the image. Because every pixel has a real Fourier coefficient and an imaginary Fourier coefficient, the real (Fourier) coefficients can be regarded as the first image and the imaginary (Fourier) coefficients can be regarded as the second image. However, it is of minor importance if the first image or the second image actually forms e.g. a two-dimensional image. The first image and the second image can be represented or regarded as a data structure having e.g. just a linear or another suitable data storage arrangement. Something similar applies to at least one of the following: result image, filtered images, intensity image, image G and image S.

In an embodiment, wherein acquiring a STED image further comprises registering an arrival time of each of the detected fluorescence photons relative to an excitation pulse for each pixel separately.

Alternatively or additionally, arrival times are registered by at least two time-gates.

In some embodiments, the calculation of the Fourier coefficients comprises the calculation of the n-th order Fourier coefficients, wherein n is a pre-selected value (a natural number).

In some embodiments, the intensity image is derived from the STED image acquisition or from a calculation of intensity values from the number of registered photons for the pixels.

In an embodiment, the image G is calculated based on dividing the filtered first image by the filtered intensity image.

In another embodiment, the image S is calculated based on dividing the filtered second image by the filtered intensity image.

In a further embodiment, the spatial filter is at least one of Anisotropic Diffusion, Total Variation de-noising, Maximum Entropy de-noising, Non-local-means and Wavelet de-noising.

Embodiments of the present invention further provide a device being adapted to carry out the method mentioned above.

Embodiments of the present invention provide a computer program performing the method mentioned above. The first and/or second image in the sense of the present application can be represented in the form of a two-dimensional array of the respective Fourier coefficients.

In an embodiment of the invention, the filters/the spatial filtering of the first image, the second image and the intensity image are applied before the Fourier coefficients are divided through the filtered intensity. Previously, the filter was applied after the method step when the images were divided. The (divided) phasor coordinates of neighbor pixels have similar values while the raw Fourier coefficients vary depending on the intensity, especially under low photon count conditions. The term phasor coordinates in the present context is used in a comparable manner as described in Lanzano et. al. For lower number of photon counts the Fourier coefficients of neighbor pixel show higher variation than for high photon counts. The different variation for similar mean value contradicts the preconditions of advanced filter methods. A median filter was chosen in prior art which performs reasonable when there is little variation of the photon counts in neighbor pixels. However, STED images show high variations that have to be preserved. When the images are filtered before they are divided, according to the present invention the preconditions for advanced filters are given. Furthermore, when filtered images are divided there is a prejudice that the filtered images might contain the information form different regions with different weight and the division step might therefore lead to a wider distribution of the phasor coordinates.

The results achieved by the above embodiment can outperform the classical/previous. It was found that advanced filtering algorithms are much more sensitive for the strong variations in the statistics in neighboring pixels.

In addition to a standard STED microscope—usually being implemented in a confocal laser scanning microscope—means for detection of arrival times of photons relative to excitation pulses of the excitation light are mandatory for the method according to the present invention. The means can e.g. contain a recording device according to the time correlated single photon counting principle (TCSPC-principle) or a recording device based on time gates.

The recorded data can be represented as number N of detected photons at the arrival time t for pixel i: $N_i(t)$. For each pixel the Fourier coefficients Freal and Fimag are calculated:

$$Freal_i = \int_0^\infty N_i(t)\cos(n2\pi ft)dt, \qquad (1)$$

$$Fimag_i = \int_0^\infty N_i(t)\sin(n2\pi ft)dt.$$

The integer value n is the pre-selected order of the Fourier coefficients. Typically, the first order (1) is selected, i.e. n=1. f is the pulse repetition rate of the excitation light. In addition, the intensity I is calculated for each pixel:

$$I_i = \int N_i(t)dt. \qquad (2)$$

In the next step the three images Freal, Fimag and I are filtered with a spatial filter, in particular with a de-noising filter. Preferably, a wide variety of advanced de-noising algorithms can maintain spatial resolution and can therefore be used in this step. For example, the following algorithms can be applied: Anisotropic Diffusion, Total Variation denoising, Maximum Entropy de-noising, Non-local-means and Wavelet de-noising.

In an embodiment a wavelet filter is chosen. The basic principle is similar to a Fourier filter for de-noising. Gaussian distributed noise causes an additional offset to the amplitude of all Fourier coefficients. The image is transformed into the Fourier space. The offset is subtracted and the image is back-transformed. This process is also called shrinkage. Wavelet space distinguishes from Fourier space by the fact that Wavelet coefficients represent frequency information for regions in the image. For Wavelet de-noising the same principle of shrinkage of the coefficients is used. The simplest method is to shrink all coefficients by the same offset. More advanced methods have been developed which can be applied to the present invention e.g. Sendur, L. & Selesnick, I., (2003), Bivariate Shrinkage with Local Variance Estimation, Signal Processing Letters, IEEE. Vol. 9. 438-441, 10.1109/LSP.2002.806054.

The shrinkage approach assumes a Gaussian distribution of the noise. For the intensity image I it is known the noise distribution is Poissonian. A way to use filters designed for Gaussian distributed noise with Poisson distributed noise is e.g. to transform the data by the Anscombe transform:

$$I' = 2\sqrt{I + \frac{3}{8}}, \qquad (3)$$

then to apply the filter and back-transform the data. The standard deviation of the noise after the Anscombe transform is 1.0.

The situation is different for the two images Freal and Fimag. After the integral operation the noise is not exactly Poisson distributed and depends on the fluorescence lifetime.

However, the situation is not as dramatic as for an attempt to filter the phasor components. In first order on can assume that the distribution is almost Poisson and the noise variance for these images can be estimated by a statistical robust method like the Median Absolute Deviation (MAD):

$$\sigma = \text{median}(|X_i - \text{median}(X_i)|)/0.67449 \qquad (4)$$

where $\sigma$ is the standard deviation and the median operations are applied to the intensities X of all pixels i. There is a dependency, in particular a linear dependency, between $\sigma$ and the optimal shrinkage offset. The factor depends on the implementation details of the wavelet transform and can be derived for the particularly used shrinkage algorithm. E.g. in Sendur, L. & Selesnick, I., the dependency is given in formula 5, Section II contains the derivation.

In the embodiment all three images Freal, Fimag and I are transformed by the Anscombe transform (3), then the noise is estimated for all three images by the Median Absolute Deviation method (4). The Anscombe transformed images are transformed into wavelet space. The coefficients are shrinked by a value derived from the estimated standard deviation of the noise. Then the shrinked images are back-transformed from wavelet space and Anscombe back-transformed. The results are the filtered images Freal_filtered, Fimag_filtered and I_filtered.

In the next step the phasor coefficients for all image pixels are calculated:

$$G_i = Freal\_filtered_i/I\_filtered_i, S_i = Fimag\_filtered_i/I\_filtered_i. \qquad (5)$$

In the last step a result image is calculated from the phasor coefficients. The calculation can be implemented similar to the SPLIT method in Lanzanò et. al. (2015), Encoding and decoding spatio-temporal information for super-resolution microscopy, Nature Communications, 10.1038/ncomms7701.

Figure 1B:
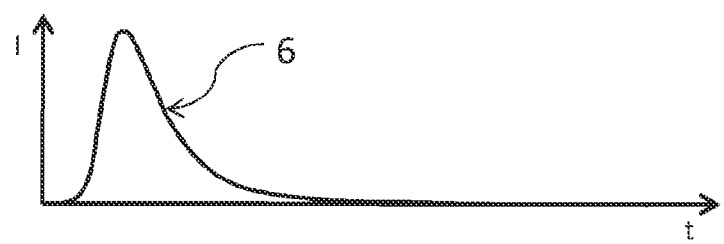
Figure 1C:
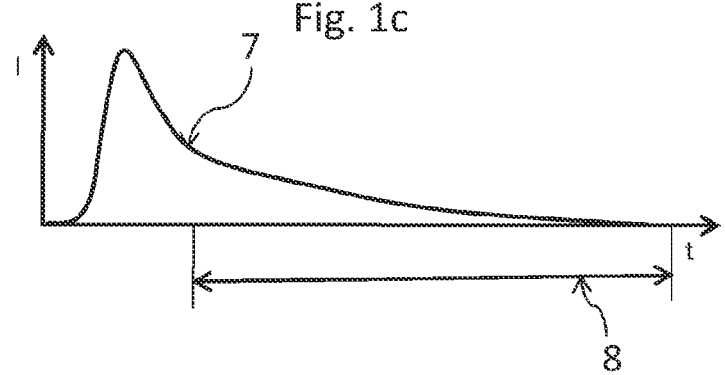
FIG. 1c shows the combined lifetime decay and a typical selection of a time gate. The location of these components in the phasor plot is depicted in FIG. 1d.

It follows an explanation why the method according the present invention behaves superior to the prior art where the phasor G and S components are filtered. FIG. 1a shows a decay diagram with intensity I along the ordinate 1 and arrival time t along the abscissa 2 with the graph 3 for the photons originating from the center region of the focus of the excitation light. FIG. 1b shows the graph 6 for the photons originating from the region outside the center of the focus, where the de-excitation light is applied. The average arrival time of the photons originating from the region outside the center of the focus is lower than the average arrival time of the photons originating from the focus. FIG. 1c shows the graph 7 for all detected photons. In time gated STED an arrival time interval 8 is chosen (e.g. by gating) where the photons from the center region dominate. The photons detected before this interval are ignored. The signal 4 (see FIG. 1a) with information about the center region is therefore lost. Only the part 5 (see FIG. 1a) of the signal is used to generate the image. The time gated approach results in spatially better resolved but noisy images compared to the classical STED method.

Figure 1D:
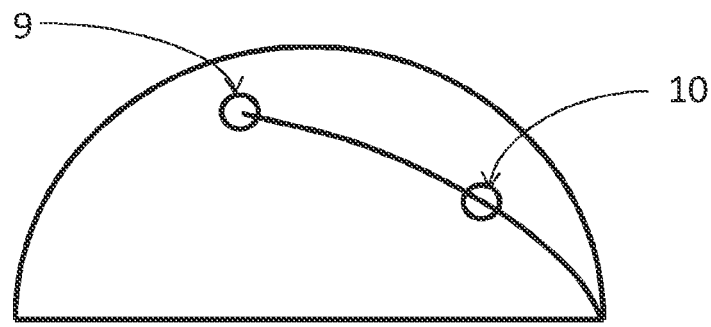

Pixels with a decay only from the center region are located at e.g. position 9 in the phasor plot (see FIG. 1d). Photons from the outside are located at a distinct position 10 in the phasor plot. The idea behind the SPLIT method (prior art) is to apply a weight to the intensity of individual pixels depending on their location in the phasor plot. This results in a spatial resolution comparable to the time gated STED method but less noise since no counted photons are lost.

FIG. 2a visualizes simulated data for an average of 10 photon counts in an image pixel. The simulation assumes a mixture of 50% photons from the center area with 4n (4 nanoseconds) lifetime 11 and 50% photons from the outside with 200 ps (200 picoseconds) lifetime 12. The phasor coordinates 13 of 20 pixels are drawn. For high photon counts the position of the phasors has to be halfway between the positions of the two components 11 and 12, i.e. at 14. The situation for low photon counts without filtering symbolized by 15 is so that due to the wide distribution in absence of a filter no improvement compared to the gating method is possible.

FIG. 2b shows the same simulated data when a 5×5 median filter symbolized by 16 is applied according to prior art. For FIG. 2c a 7×7 median filter symbolized by 17 has been used. Finally FIG. 2d shows the result when a wavelet filter according to an embodiment of the present invention is used (symbolized by 18). To achieve a comparable signal to noise ratio a 7×7 median filter is necessary.

Figure 3A:
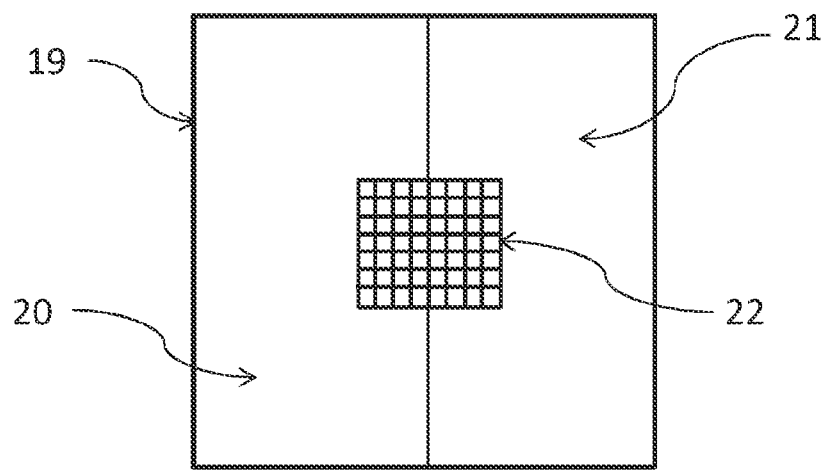
FIGS. 3a-3e show the effect of the filter regarding unwanted smoothing edges for an optimal filter in FIG. 3b, no filter in FIG. 3c, a median filter 7×7 in FIG. 3d and a filter according an embodiment of the present invention in FIG. 3e.

A filter also preserve the spatial resolution to be useful in STED applications. A simulation with two mixtures shows the behavior of the filters along an edge. In the simulation according FIG. 3a an image 19 was created with a mixture of ⅔ low resolved component and ⅓ high resolved component in the left half 20. In the right half 21 ⅓ low resolved component ⅔ high resolved component are simulated. 7 lines of 8 pixels in the center region 22 have been accumulated vertically and have been weighted with an intensity gradient along the line between the 4 ns and 200 ps position in the phasor.

Figure 3B:
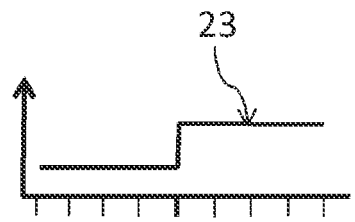
Figure 3C:
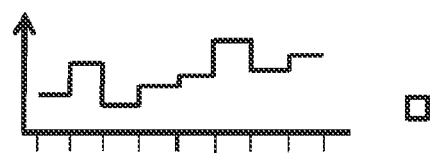
Figure 3D:
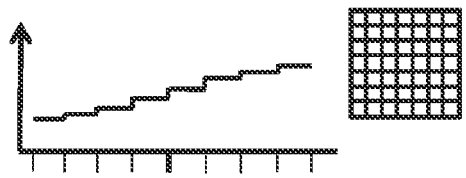

FIG. 3b shows the intensity 23 for the 8 averaged pixels for optimal condition of very high photon counts. For the case of 10 counts per pixel the intensity for the 8 averaged pixels is shown for no filtering in FIG. 3c, median filter 7×7 in FIG. 3d and wavelet filter according the present invention in FIG. 2e.

Figure 3E:
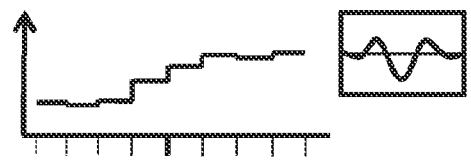

The wavelet filter according the present invention better preserves the spatial resolution (FIG. 3e) than the median filter according prior art (FIG. 3d) with comparable signal to noise ratio (FIG. 2c and FIG. 2d).

Advanced filters have been designed for similar noise characteristic in neighbor pixels. Such a filter fails when applied directly to the phasor components according prior art. Due to the division through the intensity in the phasor formulas the noise varies too much.

Some or all of the method steps may be executed by (or using) a hardware apparatus, like for example, a processor, a microprocessor, a programmable computer or an electronic circuit.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for generating a result image, the method comprising the steps of:
    a) acquiring a stimulated emission depletion (STED) image of a sample, the STED image comprising pixels;
    b) calculating Fourier coefficients of photon arrival times for the pixels of the STED image, resulting in real coefficients representing a first image and in imaginary coefficients representing a second image;
    c) deriving an intensity image from the STED image;
    d) applying a spatial filter to the first image, the second image and the intensity image, resulting in a filtered first image, a filtered second image, and a filtered intensity image, respectively, wherein the spatial filter is a de-noising filter;
    e) calculating an image G based on the filtered first image and the filtered intensity image by dividing the filtered first image by the filtered intensity image;
    f) calculating an image S based on the filtered second image and the filtered intensity image by dividing the filtered second image by the filtered intensity image; and
    g) calculating the result image based on the image G and the image S.

2. The method of claim 1, wherein acquiring the STED image comprise the steps of:
    irradiating the sample with pulsed excitation light having a focus; and
    irradiating the sample with de-excitation light surrounding the central region of a focus.

3. The method of claim 1, wherein acquiring the STED image further comprises:
    registering arrival times of detected fluorescence photons relative to an excitation pulse for each pixel separately and/or
    registering arrival times by at least two time-gates.

4. The method according to claim 1, wherein the calculation of the Fourier coefficients comprises the calculation of the n-th order Fourier coefficients, wherein n is a preselected value.

5. The method according to claim 1, wherein the intensity image is derived from the STED image acquisition or from a calculation of intensity values from the number of registered photons for the pixels.

6. The method according to claim 1, further comprising transforming the acquired STED image, the first image, the second image and/or the intensity image having a first noise distribution, to a transformed image having a second noise distribution, and executing the steps d)-g) of claim 1 based on the transformed image.

7. The method according to claim 6, further comprising the step of back transforming the acquired STED image, the filtered first image, the filtered second image and/or the filtered intensity image.

8. The method according to claim 6, wherein the first noise distribution is a Poisson noise distribution and wherein the second noise distribution is a Gauss noise distribution.

9. The method according to claim 1, wherein the spatial filter is at least one of Anisotropic Diffusion, Total Variation de-noising, Maximum Entropy de-noising, Non-local-means or Wavelet de-noising.

10. A device adapted to carry out the method according to claim 1, wherein the device comprises a STED microscope or a STED scanning microscope.

11. A computer product comprising a non-transitory computer readable medium storing program code for, when executed on a processor, performing the steps of:
    acquiring a stimulated emission depletion (STED) image of a sample, the STED image comprising pixels;
    calculating Fourier coefficients of photon arrival times for the pixels of the STED image, resulting in real coefficients representing a first image and in imaginary coefficients representing a second image;
    deriving an intensity image from the STED image;
    applying a spatial filter to the first image, the second image and the intensity image, resulting in a filtered first image, a filter second image, and a filtered intensity image, respectively, wherein the spatial filter is a de-noising filter;
    calculating an image G based on the filtered first image and the filtered intensity image by dividing the filtered first image by the filtered intensity image;
    calculating an image S based on the filtered second image and the filtered intensity image by dividing the filtered second image by the filtered intensity image; and
    calculating the result image based on the image G and the image S.

* * * * *